Patented Nov. 24, 1936

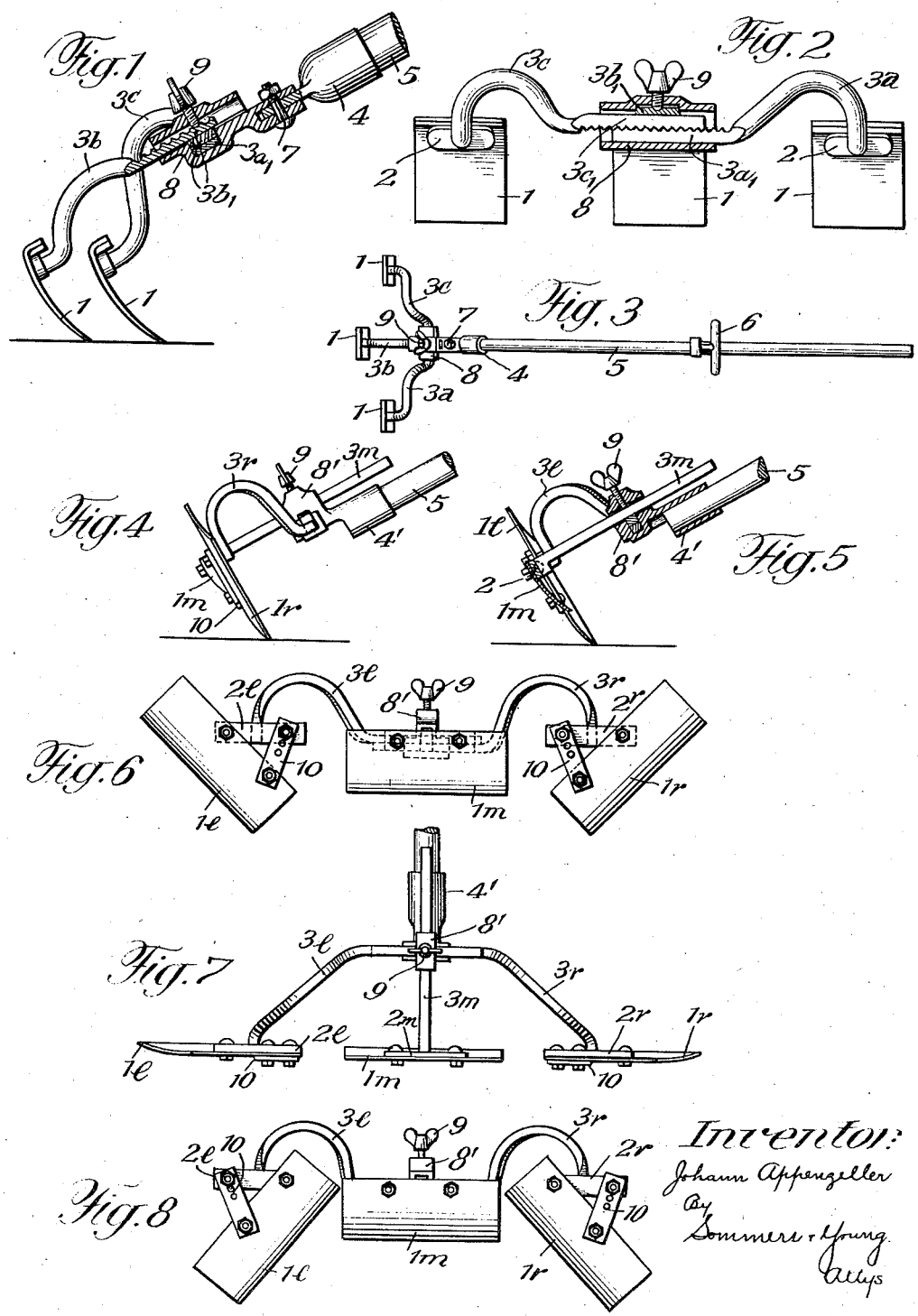

2,061,542

UNITED STATES PATENT OFFICE 2,061,542

HAND OPERATED IMPLEMENT FOR WEEDING TARE

Johañ Appenzeller, Bergdietikon, Switzerland

Application May 24, 1935, Serial No. 23,324
In Switzerland May 30, 1934

4 Claims. (Cl. 97—70)

This invention relates to hand operated implements for weeding tare and comprising a plurality of blade-shaped knives that are fastened to a handle socket by means of carrier arms.

In the known implements of this type the knives are usually fastened to the handle socket by means of carrier arms of a fixed length, so that for certain distances between plant or seed drills the implement could not be used.

According to this invention, an implement of general usefulness is provided by arranging the knife carrier arms to be adjustable relative to the handle socket so as to permit of varying the distance between knives.

Owing to this arrangement the knives can be adjusted distances apart as desired within certain limits. Furthermore, by providing a movable joint on the handle socket the possibility is offered to adjust the knives at an inclined disposition to each other.

In the accompanying drawing embodiments of the invention are shown by way of example only, in which Fig. 1 shows a broken off side elevation of a first embodiment partly in section;

Fig. 2 is a front view of this embodiment partly in section;

Fig. 3 shows a general top plan view of the same embodiment on a smaller scale;

Fig. 4 shows a broken off side elevation of a second embodiment of the invention;

Fig. 5 shows a corresponding longitudinal section;

Fig. 6 is a front view of Fig. 4;

Fig. 7 shows a top plan view of the latter embodiment, and

Fig. 8 a second front view of the same with the knives adjusted to different positions.

In the implement illustrated in the Figs. 1 to 3 three slightly curved blade-shaped knives $1$ are riveted to cross-pieces $2$ of upwardly curved carrier arms $3a$, $3b$ and $3c$.

The thus shaped knives can be made from second hand materials, such as old scythes, saw blades or the like.

To a handle socket $4$ a cross-groove clamp $8$ is fastened by means of a movable joint $7$. The upwardly curved carrier arms $3a$ and $3c$ of the two lateral knives $1$ have at their ends straight extensions $3a_1$ and $3c_1$ which project into the transverse groove of the clamp $8$ in superposed position and the inner engaging gearing flanks of which are provided with interengaging teeth. The carrier arm $3b$ of the middle knife $1$ carries also a straight end extension $3b_1$ which is guided in the longitudinal groove of the clamp $8$ and bears against the upper extension $3a_1$ of the lateral knives. The upper flank of this extension $3b_1$ is also formed with teeth between which a clamping screw $9$ is adapted to engage thereby to maintain at the same time the lower extensions $3a_1$ and $3c_1$ in position.

Owing to this arrangement the distance between the lateral knives $1$ can be varied, at will and the three aligning knives can be adjusted to a common inclined disposition by turning the cross-groove clamp $8$ round the joint $7$, or else the middle knife may be extended forwardly alone together with its carrier arm or be removed altogether.

In the handle socket $4$ the handle $5$, which is provided with a draw bar $6$, is secured in a customary manner.

In the embodiment shown in the Figs. 4 to 8 the cross-groove clamp $8'$ is fastened to the handle socket $4'$ directly so as to be rigid therewith. In this clamp the straight carrier arm $3m$ of the middle knife is inserted in a longitudinally extensible manner and the superposed carrier arms $3l$ and $3r$ of the two lateral knives $1l$ and $1r$ are inserted to be extensible in transverse directions. All three carrier arms can be clamped fast in any desired positions of adjustment by means of the thumb screw $9$.

The middle knife $1m$ is rigidly connected to a cross-piece $2m$ of the middle carrier arm $3m$, by being screwed down thereon. The two lateral knives $1l$ and $1r$ are secured to the cross-pieces $2l$ and $2r$ of the respective carrier arms $3l$ and $3r$ by means of a connection bolt and each is indirectly held in position by the adjoining cross-piece by means of flat spacing arms $10$ which are secured to the cross-pieces $2l$ and $2r$ and to the knives $1l$ and $1r$ by connection bolts.

If the flat spacing arms $10$ are connected to the inner portions of the cross-pieces $2l$ and $2r$, the knives occupy relatively inclined positions such as shown in Fig. 6, and if the spacing arms are connected to the outer portions of the cross-pieces $2l$ and $2r$ the knives are each oppositely inclined.

Both flat spacing arms $10$ have several bolt holes, in order to permit of adjusting these knives to different relative inclinations.

I do not limit myself to the particular size, shape, number or arrangement of parts as shown and described, all of which may be varied without going beyond the scope of my invention as shown, described and claimed.

What I claim is:

1. In a hand operated implement for weeding tare, a middle and lateral blade-shaped knives, a carrier arm for each of said knives, a fastening extension on each of said carrier arms, a socket for receiving the operating handle and supporting said knife carrier arms, a cross-groove clamp for accommodating the fastening extension of said middle knife in a longitudinal groove and the extensions of said lateral knives in transverse grooves of said clamp, a movable joint intercalated between said socket and said clamp, and means for clampingly securing said extensions in said grooves so as to render said middle knife extensible in the forward and said lateral knives in transverse directions.

2. In a hand operated implement for weeding tare, a middle and lateral blade-shaped knives, a carrier arm for each of said knives, a connection cross-piece on the front end of each of said arms for the respective knife, a spacing arm screwed with one of its ends to each lateral cross-piece, said middle knife being rigidly screwed down on the middle cross-piece and said lateral knives being screwed partly to said lateral cross-pieces and partly to the other ends of said spacing arms, a socket for receiving the operating handle and supporting said knife carrier arms, and means for adjustably connecting said arms to said socket so as to permit of varying the distances between said knives.

3. In a hand operated implement for weeding tare, a middle and lateral blade-shaped knives, a carrier arm for each of said knives, means for connecting said knives to the corresponding carrier arms, said lateral knives being connected inclined to said middle knife, a fastening extension on each of said carrier arms, a socket for receiving the operating handle and supporting said knife carrier arms, a cross-groove clamp for accommodating the fastening extension of said middle knife in a longitudinal groove and the extensions of said lateral knives in a transverse groove of said clamp, and means for clampingly securing said extensions in said grooves.

4. In a hand operated implement for cultivating purposes, a middle and two lateral rectangular knives each having a rectilinear edge, an adjustable arm for each of said knives, a fastening extension on each of said carrier arms, a socket for receiving the operating handle and supporting said carrier arms, a cross slot clamp connected to said socket and having a longitudinal slot and a transverse slot communicating with said longitudinal slot, the fastening extension of said middle knife being accommodated in said longitudinal slot and the extensions of said lateral knives being accommodated in said transverse slot of said clamp, and a single set screw for clampingly securing all the extensions together in said slots so as to render said middle knife extensible in the longitudinal and the lateral knives in transverse directions so as to permit alignment of the three knives with variable spaces or displacement of the middle knife longitudinally with respect to the lateral knives.

JOHAN APPENZELLER.